UNITED STATES PATENT OFFICE.

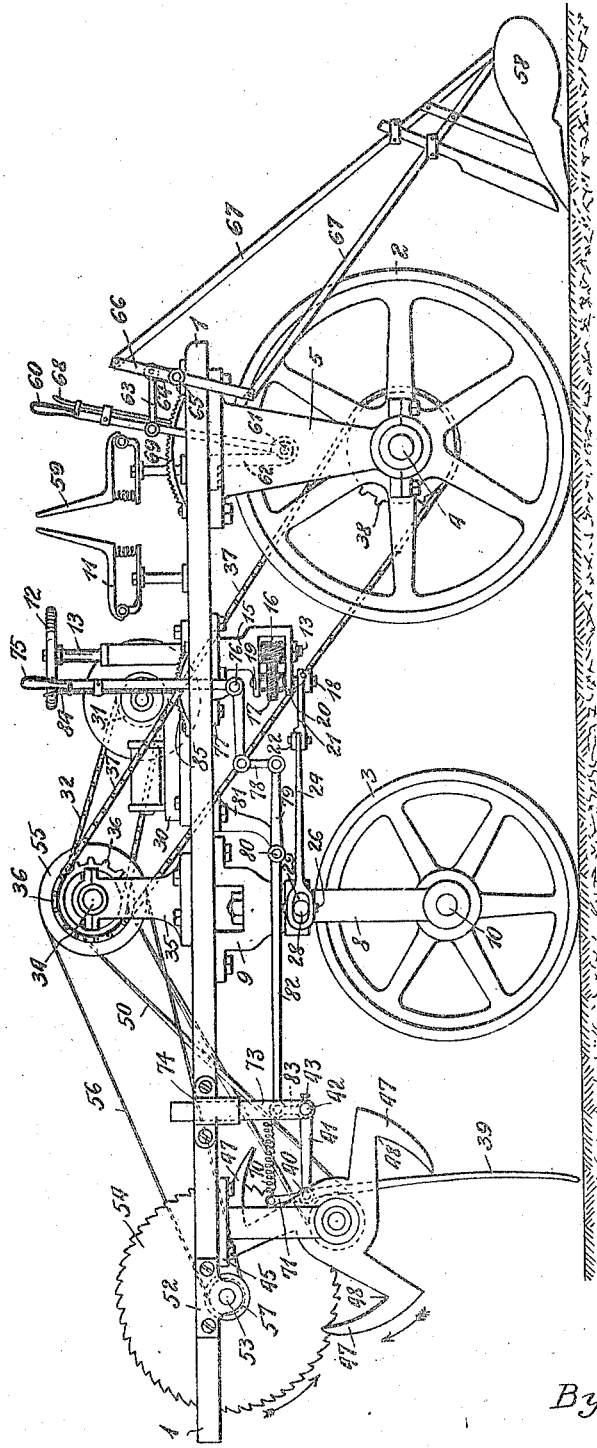

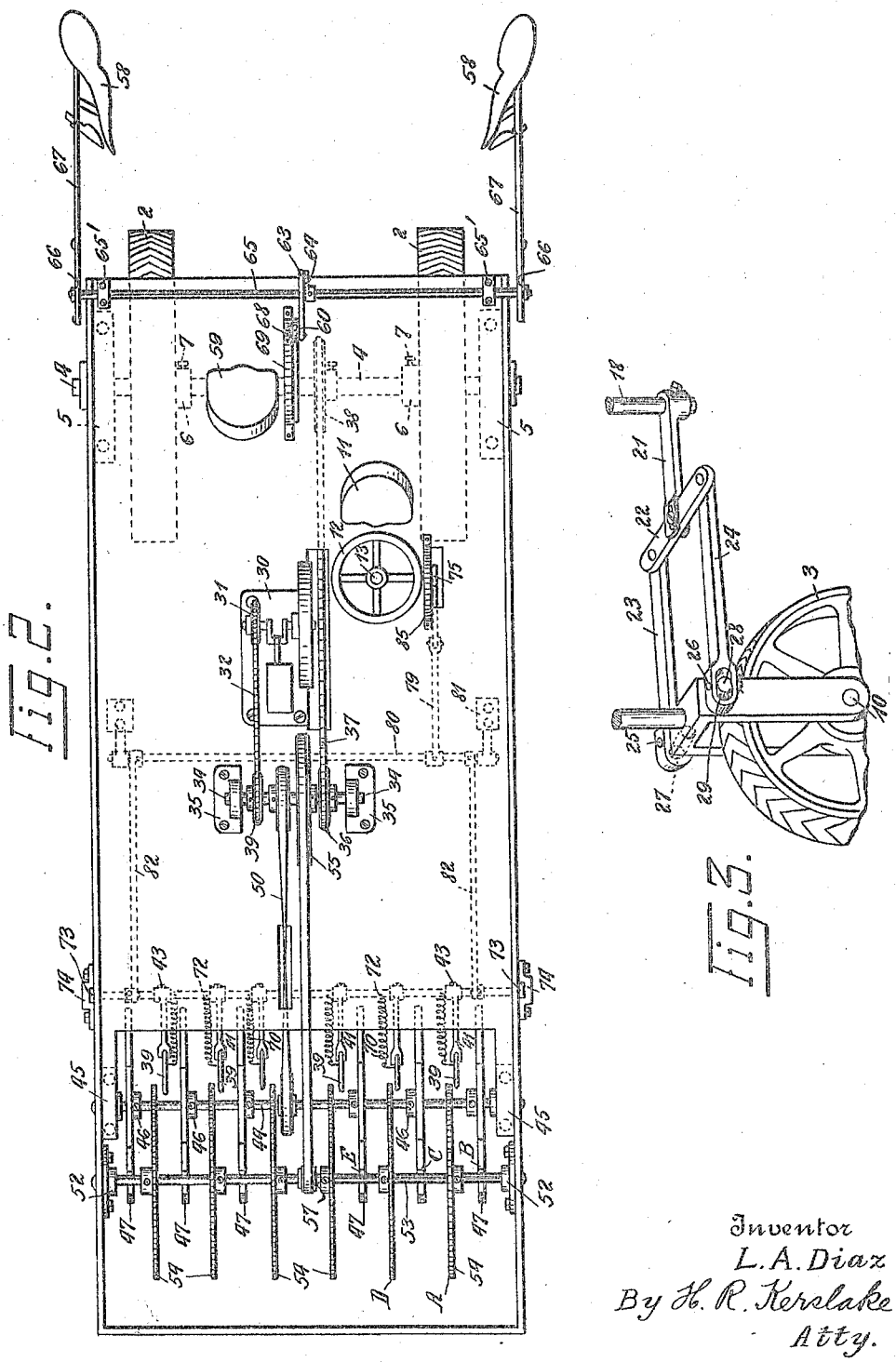

LAURA AMINTA DIAZ, OF CAMAJUANÍ, CUBA.

MACHINE FOR CUTTING CHAFF.

1,284,068.

Specification of Letters Patent.

Patented Nov. 5, 1918.

Application filed January 14, 1918. Serial No. 211,818.

*To all whom it may concern:*

Be it known that I, LAURA AMINTA DIAZ, a citizen of the Republic of Cuba, and a resident of Camajuaní, Province of Santa Clara, Republic of Cuba, have invented certain new and useful Improvements in Machines for Cutting Chaff, of which the following is a full, clear, and exact specification.

This invention relates to machines for cutting or chopping the dry leaves or chaff of sugar cane, which leaves or chaff are removed from the plant during its cutting operation at the time of harvesting it.

In the cultivation of sugar cane, machines are used to mix up the dry leaves or chaff with the earth in order to utilize the fertilizing qualities of the leaves or chaff, for making said mixture, it is necessary to cut or chop the leaves in small pieces. This operation is difficult to perform due to the length of the leaves and their very flexible condition which oppose the cutting which have been used up to now for said end.

With the object of cutting the leaves different machines and devices have been invented and experimented with without obtaining the convenient effects desired.

An object of my invention is to provide a simple machine which is of solid construction and of easy manipulation and effective operation. This machine first will form a pile of the dry leaves or chaff scattered on the ground, then will raise the chaff from said pile and then will cut same in small pieces adapted to the use to which they are designated.

Another object of the invention is to provide the necessary means for raising and lowering the members that pile the chaff, so as to adapt them to the unevenness of the ground on which the machine is to be operated.

A further object of the invention is to provide proper means for hilling or mixing the chaff with the earth, after the chaff has been cut.

And still a further object is to obtain the proper adjustment of the piling and hilling means, as well as of the wheels of the machine, so as to adapt it to labor on grounds where the furrows are at a larger or smaller distance between them, by separating said means and wheels according to the distance between two adjacent furrows.

With this and other objects in view the invention consists in the novel and original construction and arrangements of parts that will be described, and comprises the combination of adjustable members for piling the dry leaves or chaff, members for raising the chaff after it has been piled, members for cutting and dividing the chaff into small pieces, and adjustable members for hilling or mixing the chaff with the earth after it has been cut.

In the annexed drawings:

Figure 1 is a side elevation of the machine.

Fig. 2 is an upper plan view thereof; and

Fig. 3 is a perspective view of the steering device of the machine.

The machine comprises a bed or frame 1, properly supported on two tread wheels 2 disposed laterally and toward the rear part thereof, and a steering wheel 3, arranged at the front and approximately toward the central part of the machine.

The tread wheels 2 are adjustably mounted on a cross shaft 4 which rotates on bearings 5 fixed beneath the bed 1, at each side thereof, so as to adapt said wheels by separating on the shaft, to the different distances between the furrows on the ground to which effect the hub 6 of each wheel is provided with a set screw 7 whereby it can be secured to the shaft in the desired position.

The steering wheel 3 is mounted on a shaft 10 supported in a vertical fork 8 the stem of which is adapted to freely rotate in a bracket 9 fixed to the lower face of the bed.

The movement of said wheel 3 toward the left or right is effected by the operator from the seat 11, by means of a fly-wheel 12 connected to the upper end of the vertical bar 13 which rotates within two hollow supports 14 and 15 respectively fixed above and below the bed, said bar 13 being provided at its lower end with a worm-gear 16 meshing with a gear wheel 17 fixed on a short vertical shaft 18 which is supported at its ends in two lugs 19 and 20 laterally projecting from the lower hollow support 15. The shaft 18 is extended beyond the lower lug 20, and on this extension there is adjustably mounted an arm 21 which is pivotally connected at its end to the central portion of a horizontal traverse bar 22, whose ends in turn are pivotally connected to the ends of two horizontal longitudinal bars 23 and 24 each of these bars having at its other end a slot 29 through which is pivotally connected by means of a pin 25 or 26 a trunnion 27 or 28 projecting from each side of fork 8.

The traveling movement of the machine is effected by a convenient motor 30 arranged on the bed 1 and which actuates the tread wheel 2, by means of a sprocket wheel 31 fixed to the driving shaft of the motor and connected by a chain 32 to a sprocket wheel 33 fixed on a shaft 34 rotatorily mounted in bearings supported on upright posts 35 secured to the bed 1, and on said shaft 34 there is secured another sprocket-wheel 36 connected by a chain 37 with a sprocket-wheel 38 fixed to shaft 4 of tread wheels 2.

At the front of the machine there is provided the mechanism for piling, raising from the ground and cutting the chaff. This mechanism comprises piling members formed by a plurality of curved bars 39, vertically arranged and pivotally supported at 40 on the fork shape end of horizontal arms 41 adjustably mounted on a cross-bar 42 which is transversally supported underneath the bed 1 of the machine, said arms 41 being properly spaced apart on said bar 42 and secured thereon by means of a set screw 43, Fig. 2. These bars 39 so mounted constitute a rake which carries the chaff and piles same in front of it.

Immediately in front of this rake there is a plurality of reel wheels fixed on a cross-shaft 44 rotatorily mounted on brackets 45 secured to the bed 1, said wheels being formed by hubs 46 wherefrom and in a substantially tangential direction projects a plurality of arms 48, whose free ends are angled to form arched hooks 47, as shown in Fig. 1. These reel wheels are spaced apart on said shaft 44 so as to correspond with the spaces intermediating the bars 39 that form the rake, and have a rotatory movement in the direction shown by the arrow in Fig. 1, which movement is transmitted from the shaft 34 by means of a belt 50 and pulleys 49 and 51 respectively fixed to shaft 34 and shaft 44 which supports the reel wheels. The hooks 47 forming said reel wheels extend approximately to a height from the ground which is substantially equal to the height of the shaft 4 of the tread wheels 2, so that they may work on the ground while the sugar cane is somewhat grown, without injuring the sprouts.

Near the reel wheels and before them, there is revolubly mounted on bearings 52 secured at each side of the bed 1, a transverse shaft 53, on which are adjustably supported a plurality of circular saws 54, spaced apart on said shaft. Each saw 54 corresponds with the space intermediating two adjacent reel wheels as shown in Fig. 1 of the drawings. This construction is so arranged in order that each saw 54 may cut the chaff while it is held on two adjacent reel wheels thereby providing the chaff with the required resistance so that the cutting action be properly effected by saw 54. Thus for instance, and referring to Fig. 2, it will be observed that the saw indicated with the letter A is placed between the reel-wheels B and C, the one indicated with letter D between the wheels C and E and it will be understood that the reel-wheels B and C hold the chaff on themselves to be cut by saw A; the wheels C and E hold the chaff so as to be cut by saw D, and so on; obviating in this manner the inconveniences derived from the flexibility inherent to dry leaves which will be opposed to the cutting action of any cutting implement, whether same be provided with saw teeth as in the present case, or whether it should only have a cutting edge.

These saws 54 have a rotary movement in the direction shown by the arrow on Fig. 1, which movement is transmitted to said saws from the shaft 34 by means of a belt 56 and pulleys 55 and 57 respectively fixed to shaft 34 and to shaft 53 of the saws, the pulley 55 being of a much larger diameter than that of the pulley 57, with the aim of multiplying the revolutions of the circular saws to aid the cutting of the chaff.

At the rear of the bed 1 are supported plows 58 which can be of any well known type and are designed to hill the chaff after it has been cut, by mixing same with the earth.

These plows 58 are supported from the bed 1 in a manner by which they can be completely raised or lowered to more or less depth in the ground, to which effect the operator on seat 59 actuates a lever 60 pivoted at 61 on a bracket 62 secured to the bed or frame 1 of the machine. To said lever 60 there is pivotally connected a link 63 which is articulated to a crank 64 fixed to a bar 65 transversely arranged and pivotally mounted on bearings 65' secured to bed 1 there being fixed to each end of said bar 65 a double arm 66 to whose ends are fixed the inclined bars 67 forming the structure carrying the plow 58. As it can be seen, by means of this device the plows can be raised or lowered according to the requirements of the work, and they will be adjusted in position by the catch 68 slidably mounted on lever 60 and which engages with the geared segment 69 secured to the bed 1.

The curved bars 39 forming the rake, are normally held in a vertical position by their proper weight against the tension of springs 70 connecting the upper extension 71 of each bar 39 above the point 40 to an eye-bolt 72 fixed on bar 42. In this manner, each bar 39 works freely and independently of the others, whereby, if any obstruction arises such as for instance a raise on the ground, a stone, or an excessive accumulation of chaff, a bar 39 will yield back and incline itself backward so as to pass over such obstruction, and as soon as such obstruction passes the bar 39 will return immediately to its normal position.

The machine is also provided with the necessary means for raising or lowering the whole of the rake when the unevenness on the ground shall require it. For this, the bar 42 is supported at its ends on plates 73 which are vertically guided in hollow supports 74 fixed to each side of the bed 1. These plates 73 together with the bar 42 and all the other members comprising the rake can be raised or lowered more or less by the operator from seat 11 by means of a crank lever 75 fulcrumed at 76 on a bracket 77 and connected by a link 78 to an arm 79 fixed to a cross bar 80 rotatorily mounted on brackets 81 secured to the bottom of the bed, there being also fixed on said bar two horizontal arms 82 which are connected by a link 83 to bar 42, the crank lever 75 being adjusted in the desired position by the catch 84 engaging with a geared segment 85 which is properly fixed on the bed 1.

In operating the machine, the bars 39 forming a rake will gather and pile in front thereof the chaff which is scattered on the ground, and the forks 47 of reel wheels 48 will raise the chaff piled by said bars 39, while the circular saws 54 will cut it.

It is obvious that changes and modifications can be made in the invention without altering its spirit, wherefor I desire not to be limited to what I have described and represented in the drawings, this being merely to illustrate the invention, but it should be understood that I desire to protect what is within the scope of the appended claims.

What I claim is:

1. A machine for cutting chaff, comprising in combination, a frame mounted on wheels, adjustable members for piling the chaff, rotary members for raising same after it has been piled, rotary members for cutting same in small pieces, adjustable means for hilling or mixing it with the earth after it has been cut, and means for rotating the rotary members.

2. A machine for cutting chaff comprising in combination, a frame mounted on wheels, adjustable members comprising a rake for piling the chaff, rotary members comprising reel-wheels for raising the chaff after it has been piled, rotatable circular saws for cutting the chaff in small pieces, plows to hill the chaff or mix same with the earth after it has been cut, and means for rotating the reel wheels and the saws.

3. A machine for cutting chaff, comprising in combination a frame mounted on wheels, a rake member for piling the chaff, rotary members before the rake member for raising the chaff, rotary members before and above the raising members for cutting it in small pieces, and driving means for rotating the rotary cutting and raising members.

4. In a machine for cutting chaff, in combination a rake for piling the chaff scattered on the ground, a plurality of reel-wheels immediately in front of the rake for elevating the chaff piled by the latter, a plurality of rotary saws arranged in the spaces intermediating the reel-wheels for cutting the chaff raised and held by the same, hilling members for mixing the chaff with the ground after it has been cut, driving means for rotating the reel-wheels and the saws, adjustable means for raising or lowering the rake according to the unevenness of the ground on which it is working, and adjustable means for raising or lowering the hilling members according to the requirements of the labor.

In testimony whereof I affix my signature.

LAURA AMINTA DIAZ.